US010223751B1

(12) United States Patent
Hutchinson et al.

(10) Patent No.: US 10,223,751 B1
(45) Date of Patent: Mar. 5, 2019

(54) MULTIVARIATE PREDICTIVE SYSTEM

(71) Applicant: Progressive Casualty Insurance Company, Mayfield Village, OH (US)

(72) Inventors: Richard Hutchinson, Mayfield Village, OH (US); William Everett, Mayfield Village, OH (US); David Pratt, Mayfield Village, OH (US); Raymond Ling, Mayfield Village, OH (US)

(73) Assignee: PROGRESSIVE CASUALTY INSURANCE COMPANY, Mayfield Village, OH (US)

( * ) Notice: Subject to any disclaimer, the term of this patent is extended or adjusted under 35 U.S.C. 154(b) by 303 days.

(21) Appl. No.: 14/627,662

(22) Filed: Feb. 20, 2015

Related U.S. Application Data

(63) Continuation-in-part of application No. 13/364,953, filed on Feb. 2, 2012.

(60) Provisional application No. 61/942,468, filed on Feb. 20, 2014.

(51) Int. Cl.
*G06Q 40/08* (2012.01)
*G06F 17/30* (2006.01)

(52) U.S. Cl.
CPC ....... *G06Q 40/08* (2013.01); *G06F 17/30371* (2013.01)

(58) Field of Classification Search
CPC ..................................... G06Q 40/08
USPC ............................................... 705/4
See application file for complete search history.

(56) References Cited

U.S. PATENT DOCUMENTS

| | | | | |
|---|---|---|---|---|
| 2007/0265908 | A1* | 11/2007 | Berkman | G06Q 30/02 705/35 |
| 2009/0055521 | A1* | 2/2009 | Nakatsuru | H04L 45/02 709/223 |
| 2010/0223078 | A1* | 9/2010 | Willis | G06Q 40/08 705/4 |
| 2012/0072244 | A1* | 3/2012 | Collins | G06Q 40/08 705/4 |
| 2015/0019553 | A1* | 1/2015 | Shaashua | H04W 4/70 707/737 |
| 2016/0112522 | A1* | 4/2016 | Abello | H04L 67/22 709/224 |
| 2017/0048280 | A1* | 2/2017 | Logue | H04W 4/008 |

* cited by examiner

*Primary Examiner* — Hao Fu
(74) *Attorney, Agent, or Firm* — Brinks Gilson & Lione

(57) ABSTRACT

A multivariate predictive system processes usage based data that includes a database engine that provides access to a plurality of database management systems that mine diverse sources of usage based data. A digital filter selectively filters data streams that include usage based data. A sampler automatically divides the filtered data into sample groups and stores the sample groups in a memory. The sampler divides the filtered data according to insurance rating variables processed by a processor programmed to underwrite an insurance product and rate that insurance product. Some samplers store the divided filter data in a local memory. A multiplier multiples rating factors preprogrammed with the insurance rating variables with a base rate of insurance to determine an insured's insurance premium.

21 Claims, 3 Drawing Sheets

MULTIVARIATE PREDICTIVE SYSTEM

PRIORITY CLAIM

This application claims priority to U.S. Provisional Application Ser. No. 61/942,468 entitled "Multivariate Predictive System," filed Feb. 20, 2014, and is a continuation in part of U.S. application Ser. No. 13/364,953, entitled "Mobile Insurance Platform System," filed Feb. 2, 2012, both of which are incorporated herein by reference.

BACKGROUND OF THE INVENTION

1. Technical Field

This disclosure relates to insurance-based systems and methods, and more particularly to predictive analytics that optimizes insurance prices and improves insurance rating.

2. Related Art

Insurance companies rely on traditional underwriting and rating methods to forecast insurance costs and determine the prices of insurance products. Some insurance companies determine insurance premiums by analyzing a single factor. When setting homeowner rates, for example, some insurance companies focus on home values. Other insurance companies consider many factors. Some homeowner's rates are based on where a home is located, the value of the home, the home's construction, and the age of the home.

Property-casualty insurers have been trying to figure out how to get insurance policies into the hands of insured's cost-effectively. Some have considered non-traditional underwriting processes. However, barriers to these processes come from the data the processes need to qualify customers and data needed to monetize the insurance products. Some processes cannot assure the validity of the data, the quality of the data, the quantity of the data need, and its availability. And, some processes cannot identify the source of the data or protect the source's privacy. Other issues include ensuring that the underwriting and rating processes do not unfairly discriminate. One of the most significant barriers is figuring out what is meaningful and what is not.

BRIEF DESCRIPTION OF THE DRAWINGS

The inventions can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
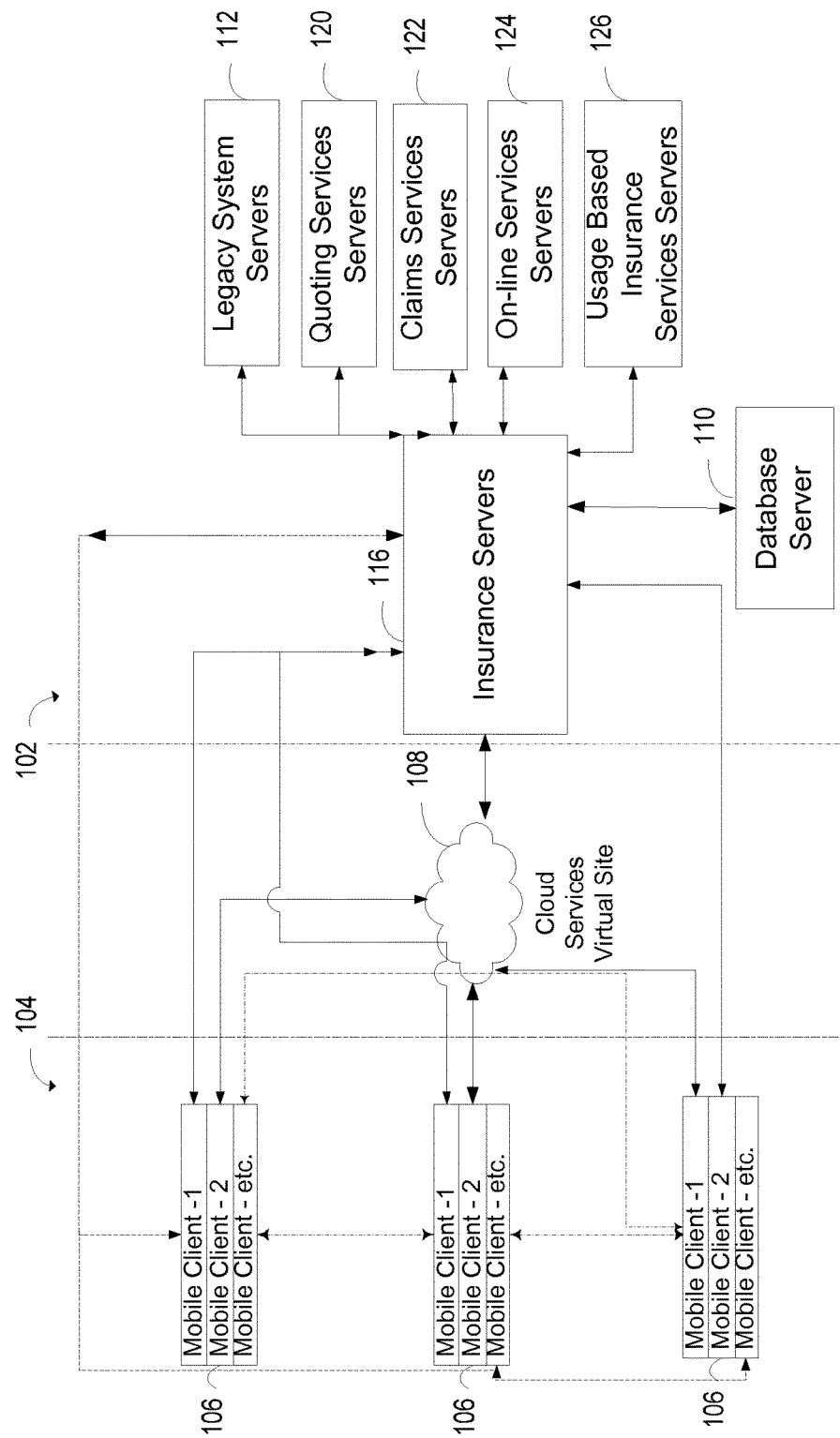
FIG. 1 is a block diagram of an exemplary predictive system architecture.
Figure 2:
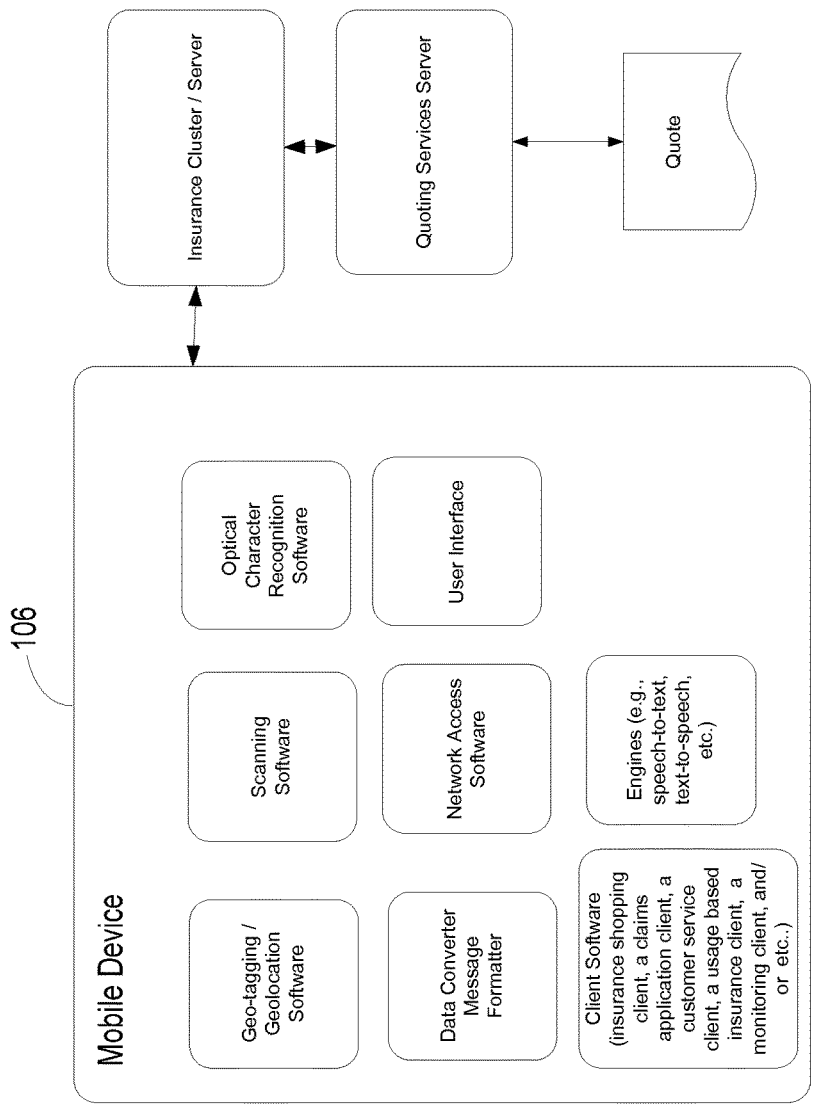
FIG. 2 is a block diagram of an exemplary mobile client device in communication with an insurance server cluster.

This disclosure describes multivariate systems and methods (referred to as predictive system(s)) that deliver insurance products quickly and cost effectively. The predictive systems mine data to identify underlying trends, patterns, and relationships that provide information about an insured, an insured's property, and/or potential customer(s). Some predictive systems capture and process data at nearly the same rate that the data is received. The data is stored in clusters of in-memory data grids (IMDG) that store the data structures entirely in volatile RAM (random access memory) or non-volatile RAM, such as flash. The data feeds trigger one, two, or more processors in multi-core systems that include mobile client and/or backend servers. The in-memory data grids enhance performance because data may be written to, and read from, memory much faster than a hard disk or conventional data structures. Further the data grid may be easily scaled, and upgrades easily implemented. Similarly, the multi-core systems enhance performance, reduce power consumption, and are more efficient in processing multiple tasks. Some multi-core systems process the tasks simultaneously through two or more processors that in some architectures may be distributed through cloud services and/or virtual sites.

Other disclosed systems process data in the actual time in which an insurance process occurs if under computer control without intentional delays (e.g., in real time) that once processed may be stored in a data store in the backend. Some systems estimate and forecast costs (e.g., loss costs), associate customer attributes to insurance scores, and associate specific customer behavior to pricing or cost data. The pricing or cost data may reflect a quote offered to a new customer or to an existing customer for new business or an insurance premium reflecting a price adjustment offered at a renewal term. The predictive systems may establish precisely how much an insured or potential customer is charged based on customized predictive models developed from the analysis of (non-intuitive) usage based data generated by the user's own behavior.

Besides insurance ratemaking, some predictive systems simplify or replace traditional insurance underwriting, making the underwriting processes fully automated, extremely efficient, and user friendly. Unlike traditional underwriting processes that offer little flexibility and require comprehensive human evaluations, some predictive models speed up the underwriting assessment process by eliminating that analysis or replacing the analysis of certain information. The predictive models replace traditional underwriting assessments with automated underwriting processes that determine customer eligibility based on the predictive properties of usage based data. The usage based data may be read directly from mobile devices, wearable devices, home gateways, and/or connected devices through built-in interfaces such as JPA-enabled Cloud SQL application interfaces or NoSQL interface, for example, that interface the transmitting devices. The analysis of usage based data measures the correlations to indicator of risks of a specified loss or damage to an insured object. By this analysis, some insurers may not require eligibility assessments for new customers or more assessments for existing customer as their circumstances or their insurance needs change. For homeowners insurance, for example, traditionally insureds notify insurers of certain perils, such as the addition of an aggressive dog breed or the addition of an attractive nuisance, such as a trampoline. When using predictive systems, homeowners may not be required to provide these notifications, because the predictive systems make the final decisions based on analysis of usage based data, or in the alternative make intermediate underwriting decisions based on that analysis. The analysis may be based on actual user data collected over a long period of time, such as one or more weeks or months, or over a short period of time, such as a day or hours of monitored activity. The activity need not be directly related to the risk of loss that is being insured against, and in some cases may also include actual user data related to that risk.

An exemplary predictive system analyzes usage based (insurance) data that identify trends, patterns, or relationships found in driving behavior for other product lines of insurance. In the predictive system shown in FIG. 1, a telematics enabled mobile device 106 (three are shown) or connected car system detects and synchronously or asynchronously monitors and stores usage based vehicle data associated with a driver. The driver may be identified by an automatic driver identification system. The automatic driver identification system may be remote from the mobile device 106 (e.g., may be an in-vehicle device or a unitary part of the vehicle within the vehicle's driver information system) or may be one or more native applications written for, resident to, and executed by the hardware platform of the mobile device 106 (three mobile clients are shown). Through a video scan of a driver's face and their surroundings, live high definition or ultra-high definition video(s) captured by one, two, or more cameras of the mobile device 106 or other acquisition devices may simultaneously track and simultaneously acquire the face and position of the individual. Some acquisition devices capture unique characteristics that identify the individual's location such as the individual's position in the driver's seat for example or may capture global positioning coordinates that identify the individual as the driver. Facial and environmental characteristics captured by the camera(s) are processed into a plurality of biometric templates that are stored in memory (such as an IMDG or IMDG like memory) locally in the mobile device 106 or asynchronously transferred into a IMDG array, database server 110 or the computing cloud 108 through a secure wireless or fixed network. A computing cloud or cloud 108 comprises a plurality of physical computing machines and nodes remote from the transmitter of the mobile device 106; for example, the computing cloud 108 may comprise server clusters that run on a computer, one or more durable storage devices, durable I/O ports and devices, and processing queues. The computing cloud may read data directly from the mobile device 106 through an interface such as a NoSQL interface. A secure wireless and/or fixed network may communicatively couple the nodes synchronously or asynchronously in the cloud 108 to the transmitter of the mobile device 106.

Through the automatic driver identification system some of the biometric templates that comprise broken up digital representations of individual's distinct physical characteristics may be compared against a closed-set of authorized driver templates under an existing insurance policy created from previously generated insured photos or previously acquired templates stored in an external database server 110 or the cloud 108 or an open-set of templates that may be processed when generating an insurance quote that may be stored in an electronic memory and may be accessible locally from the vehicle or via an outsourced third-party service or cloud 108. Remote computing clusters 116 associated with or acting on behalf of an insurance company in communication with the mobile device 106 or the mobile device 106 itself executes the comparison that renders a recognition, an individual's verification, and an identification of the individual and their location (e.g., in the driver's seat position), which may include a confidence level or probability of a correct identification. Some driver identification systems may asynchronously transmit match identification results through the mobile device's 106 telematics, network connections or via the vehicle to the cloud 108 or to the remote computing clusters 116 for human assisted verification when an identification includes a confidence level that is below a predetermined confidence threshold retained in the memory of the mobile device 106 or vehicle. The automatic driver identification system may operate through or with other image/video acquisition devices including, for example, Department of Motor Vehicle ("DMV") cameras and Original Equipment Manufacturer ("OEM") in-vehicle cameras. When a driver is identified, identification data is associated with and/or stored with the usage based data within the mobile device 106, within memory of the vehicle, or is asynchronously transferred to the cloud 108 or to an intermediary who is acting on behalf of an insurer. The integration of the identification data with the usage based data within the mobile device 106 or within memory of the vehicle reduces data errors that may occur if data is not unified and transmitted separately to a destination and reduces the communication bandwidth that is required to transmit separate usage based data and identifier data. Identification systems and processes may be supplemented or occur through other biometric modalities such as fingerprint identifications (e.g., may be detected by fingerprint sensors within or on the steering wheel) iris identifications, hand geometry, speaker or voice structure, ear structure, odor, palm prints, etc.

Not all automatic driver identification systems are template based. For example some mobile device 106 driver identification systems are based on "voice models" and sound localization processing that identify the source and location of the sound through multiple directional microphones interfaced to the mobile device 106 that identify speech sources and speech direction. The voice recognition systems compare speech segments and its directionality based on latency measurements of voice segments detected from two or more microphones or speakers that are a unitary part of the mobile device 106 or are interfaced to the mobile device but are positioned in the vehicle. The speech segments and its directionality are compared to "voice models" and directional data stored in memory of the mobile device 106 or the cloud 108 to recognize, verify, and identify the individual and their location. Other automatic driver identification systems include FOBs or smart cards carried by the driver that may include identifying information (e.g., biometric templates, voice models, seat/pedals/steering wheel position, etc.) that is uploaded to the automatic driver identification system when the individual comes in proximity to the vehicle or the driver's compartment, which is then processed against the captured video as described by the algorithms above to make driver identifications.

With the driver identified, an insurance client resident to the mobile device 106 monitor, records, and stores an association or the driver's identity (in an application log that is automatically generated and maintained by the mobile device 106) with some or all of the outputs of sensors that are integrated within, unitary to, or in communication with the mobile device 106 to assess a level of risk of a driver's behavior. The assessment and identity of the driver may be processed to determine a price or cost of insurance for the insured (e.g., an insurance premium, an insurance deductible, etc.), or a discount to a price or cost of insurance and/or a surcharge to a price or cost of insurance for the insured. Through a personal area network sourced within the vehicle, such as a Bluetooth network, some mobile devices 106 may also directly monitor, or exclusively monitor one, two, or more in-vehicle operating sensors. The data may be physically or wirelessly transported through a physical or virtual vehicle data bus. The data may also be transmitted directly from in-vehicle OEM sensors and/or indirectly through the processors that manage powertrain, safety, entertainment, comfort, or ancillary in-vehicle and out of vehicle operations, etc. that may process some or all of the sensor data. Data may be communicated directly to the mobile device 106 (e.g., from the in-vehicle sensors), from in-vehicle OEM processors or out-of-vehicle processor(s) through the physical or virtual vehicle data bus. A powertrain or powertrain module is an electronic device or controller that controls the vehicles engine management system and transmission management system. The controller measures multiple events (via OEM vehicle sensors) enabling "real time" adjustment and control of fuel, airflow, spark, and gearshift to enable the powertrain system to operate efficiently, reliably, and economically.

The mobile device 106 may detect and synchronously or asynchronously monitor and store (locally on the mobile device side 104, the insurer's back end 102 and/or on-line computing cloud storage resources 108) data or output generated by its own mobile device sensors or interfaced in vehicle-sensors that are part of the vehicle. The sensors may include any one or any combination of devices that detect and/or measure driving behavior or a vehicle's state, including the corresponding times and dates that the data is received and/or stored in or through the mobile device 106. The mobile device 106 and sensors may monitor miles driven; types of roads driven on via the location services in the vehicle or mobile device 106 (high risk vs. low risk) and third party databases (such as those available through Skyhook located in Boston, Mass.); speeds driven; safety equipment used, such as seat belt and turn signals; time driven, by day, week, month, date; rate of acceleration; rate of braking (or deceleration); observation of traffic signs (and signals); traffic conditions (high congestion vs. low congestion); road conditions; acceleration events; deceleration events; force/lateral acceleration or characteristics that indicate a hard turning maneuver; temporal characteristics (e.g., period of time an ignition is active or internal power bus is sustained); Revolutions Per Minute or RPM, transmission setting (Park, Drive, Gear, Neutral, etc.); throttle position; engine coolant temperature; intake air temperature; barometric pressure; manifold absolute pressure; oxygen sensor; coolant sensor; entertainment status (e.g., visual or audio systems integrated or interfaced to vehicle); brake light on; turn signal indicator on; headlamps on; hazard lights on; back-up lights on; parking lights on; wipers on; doors locked; key in ignition; key in door lock; horn applied; battery voltage; information from body sensors; airbag deployment; ABS application; level of fuel in tank; brakes applied; accelerator applied; radio station or multimedia tuned in; seat belt on or off; door open; tail gate open; odometer reading; cruise control engaged; anti-theft disabled; occupant in seat; occupant weight; accelerator/brake pedal depression (e.g., measured in degrees or force applied); accessories (e.g., mirror settings, dash light status, etc.); vehicle location (e.g., navigation related information); date; time (such as, Greenwich Mean Time), vehicle direction; IVHS data sources (e.g., wide-area Intelligent Vehicle Highway Systems); pitch and/or roll; relative distance to other objects; vehicle in skid; wheels in spin; closing speed on vehicle in front; closing speed of vehicle in rear; closing speed of vehicle to side (right or left); space to side of vehicle occupied; space to rear of vehicle occupied; space to front of vehicle occupied; lateral acceleration; rotation of vehicle (e.g., sudden); loss of tire pressure (e.g., sudden); malfunction indicators or lights (e.g., check engine light); service required indicators or light; diagnostic trouble codes; distance traveled; vehicle speed in excess of speed limit; observation of traffic signals and signs; relative braking or acceleration or deceleration events; road conditions; traffic conditions; vehicle position; ignition On/Off (e.g., may measure length of time an ignition switch is activated); acceleration thresholds; velocity thresholds; elapsed time; battery voltage levels; vehicle operating conditions (e.g., system health); traction; location and geofencing; remote activation; vehicle motion; clutch engagement or disengagement; power bus activation (may measure the length of time power is sourced to a bus or a conductor); seat belt use; vehicle orientation; etc.

At the insurer side 102 or through an intermediary (hereinafter referred to as the "insurer's side"), the predictive system stores the usage based data in one or more IMDGs or database servers 110. The database server 110 may also include a database engine that provides remote access to a plurality of distributed database management systems that mines and makes available usage based data from other remote data sources, such as data generated from other monitoring or vehicle monitoring devices or made available through virtual Web sites. The insurer side 102 may process the usage based data exclusively or with other data accessible to the insurer's side 102 through automated interfaces that may retrieve data served through legacy systems 112, quoting systems 120, claims processing systems 122, on-line servicing systems 124, and other usage based data served through usage based systems 126. At the insurer side 102, this processing at the insurance server clusters 116 renders one or more insurance ratings (i.e., the computation of a price for a risk based on the processing of the usage based data and values related to risk), a classification rating or ranking (e.g., a position assigned on an insurance scale), safety ratings, insurance scores, and/or driver scores. A safety score is a value computed by one or more insurance companies or on behalf of one or more insurance companies that represent, or represents in part, the probability of an insured filing a claim during the insured's insurance coverage term. The safety score may be based on classifications of usage based data in risk classification classes exclusively, or in the alternative may be based on a combination of usage based data classifications, other risk classifications, and m one or more measurable variables, such as a credit rating, for example, that are formed from expected loss. An expected loss is the probability of an insured requesting payment under an insurance contract due to a covered loss or a covered accident multiplied by the likely cost of paying on an insured's behalf under that insurance contract.

Based on the insured's propensity for risk reflected in the safety score, the predictive systems assess the insured's propensity for risk in other dimensions of insurance or insurance products. For homeowners insurance, for example, some predictive systems process usage based vehicle data because the predictive systems identified in this disclosure, for example, showed strong correlations between behaviors that lead to filing vehicle claims with behaviors that lead to filing homeowner claims.

When a customer decides to purchase insurance or renew an insurance policy an insurance rating system may compute a final premium based on one or more rating variables that reflect usage based data. In some predictive systems, a final insurance premium is the product of a surcharge or discount determined from usage based data. Other predictive systems determine a final insurance premium by the product of rating factors that include one or more usage based rating factors. Other systems execute a more granular analysis that makes actual usage based characteristics rating variables. Characteristics may include data about location, driving distances, hard braking events, and maintenance habits, for example.

An exemplary predictive system that underwrites homeowners insurance may be based on multiple rating variables. Six rating variables may be the home's age, the home's type of construction, the home's location, the homeowner's claim history, risk factors on the property, and a homeowner's credit score. Each rating variable may be segmented into multiple rating classes that divide or differentiate the rating variable into groups. The rating classes are mutually exclusive groupings of risk with similar risk characteristics and expected insurance claims loss (or insured's costs), that has sufficient homogeneity with respect to the expected insurance claims loss (or insured's costs). In other words, the homogeneity of the ratings classes establishes rating classes that have similar risk probabilities. Risk probabilities are the probabilities of the possible outcomes associated with the covered risk; each outcome reflects both a timing element and level of severity element. For the outcomes of the predictive systems to be credible, the average frequency of past occurrences that establish the ratings classes should be good predictors of the average frequency of future occurrences. In some predictive systems, the ratings classes are based on usage based data and in some systems, exclusively based. Each class is associated with a rating factor that may in some embodiments comprise a numerical rating factor. If the age of a home is divided into four mutually exclusive age classes (because the risk, timing, and severity of loss probabilities of a claim against a homeowner's policy at this particular geographic location may be predicted in part from the age of a home in this example), the four mutually exclusive age classes may be: less than 10 years old, 10 years old to less than 20 years old, 20 years old to less than 50 years old; and greater than 50 years old. Each age class (for that home's geographic location) is assigned a numerical rating factor. Based on the six home characteristics identified in this example, each characteristic is placed into only one rating class which is associated with a numerical multiplicative rating factor. The six characteristics of the home in this example are placed into six rating classes that identify six multiplicative numerical rating factors. The product of the six numerical rating factors and a base insurance rate calculates an unadjusted homeowner premium. A base insurance rate comprises an insurance company's cost for a particular line of insurance at certain liability limits and deductibles under an insurance policy contract (or insurance coverage levels under an insurance policy contract) and a required profit margin for that insurance line at those liability limits and deductibles under the insurance policy contract (or at those insurance coverage levels under the insurance policy contract) established by the insurer, which an initial insured's cost (an initial premium paid by the insurance policyholder), is determined from.

Discounts and surcharges to the unadjusted homeowner premium in this example are based on usage based driving data unique to the driver reflected in that driver's safety score(s). In this predictive system, full or graduated discounts or surcharges are multiplied against the unadjusted homeowner's premium, making the final premium individualized and correlated to the actual behavior of the homeowner (who is also the driver and/or includes one or more insured drivers under that homeowner's vehicle insurance policy or reside at the dwelling). The discounts or surcharges may be based on one or more graduated pricing scale(s) where the calculated discount or surcharge is based on the position of the driver's safety score on the graduated pricing scale. The higher the driver safety score, the greater the discount. And, when below a preprogrammed threshold, the lower the driver safety score, the greater the surcharge. Thus in an exemplary pricing scheme, the highest safety score on the pricing scale may be associated with an exemplary preprogrammed adjustment factor such as 0.7, for example, (reflecting a 30% discount to the unadjusted homeowner premium) and the lowest safety score on that scale may be associated with an exemplary preprogrammed adjustment factor such as 1.05 (reflecting a 5% surcharge to the unadjusted homeowner premium) for example. The product of the unadjusted homeowner insurance premium and the adjustment factor results in a final homeowner premium for an insurance policy's term, which is based on the insured's behavior captured in the driver's usage based vehicle data.

An alternative rating system used by some predictive systems processes one or more usage based variables with other rating variables. In the homeowner example, the six rating variables identify six multiplicative numerical rating factors and the driver safety score identifies a seventh multiplicative numerical rating factor identified by the automated classification of the driver safety score into a driver safety score class associated with a multiplicative numerical rating factor. Unlike traditional rating variables, the driver safety score variable is segmented into driver safety score classes (or rating groups) that reflect common risk of loss based on actual usage based data. In this example, the driver safety score classes are based on actual usage based driving data monitored and segmented into groups based on the driver's prior usage data and/or other driver's actual usage data. The product of the seven rating factors and a base insurance rate calculates the final homeowner premium.

Another alternative rating system used by some predictive systems process one or more combinations of usage based characteristics as rating variables. When rating homeowner's insurance for example, some predictive systems may process granular data as rating variables. For example, some predictive systems may process driver location and/or driving distance, and/or number of hard brakes, and/or maintenance as rating variables alone, in any combinations, and/or with other rating variables, such as the six homeowner rating variables described above for example. These predictive systems rate a driver's location as a rating variable and/or their driving distances as a rating variable when rating homeowner's insurance because these characteristics may indicate how frequently a homeowner is home to minimize or prevent insurable events. Some predictive systems may rate a driver's hard braking events as a rating variable when rating homeowner's insurance because fewer hard braking events may be indicative of a cautious homeowner. Other predictive systems may rate how quickly (e.g., if or when) a driver responds to a malfunction indicator (e.g., check engine light) or service required indicator as a rating variable when rating homeowner's insurance, because the timing and maintenance of a vehicle may be correlated to the likelihood of a homeowner maintaining their home. Using the rating algorithm described above, the final insurance premium is the product of each of the multiplicative numerical rating factors associated with the granular data class the usage based data falls within and a base insurance rate. The final premium can also include more rating variables (and thus be based on more multiplicative numerical rating factors) when additional characteristics are processed by the predictive systems.

Other usage based data generated by home monitoring and control systems and user wearable devices may also be processed as rating variables. These predictive systems may first underwrite applicants and then rate insurance products that more closely align risk with the insured's environment and the insured's actual behavior directly related to a homeowner's risk (or may be processed to underwrite and rate insurance products not directly related to the data). Some predicative systems interface intelligent smart home devices that include smart utility meters that measure energy, gas and water consumption, and one or more network connected consumer controlled systems that may include network connected programmable thermostats that measure temperatures and heating and cooling schedules, for example; network connected smoke and carbon monoxide detectors that detect smoke and carbon monoxide levels; network connected programmable water heaters that measure energy and hot water consumption; network connected home fire sprinkler systems that detect and respond to fires; network connected environment stations that detect some or all indoor and/or outdoor temperatures, weather conditions, air quality, carbon monoxide levels, humidity levels (e.g., indicators of water damage or floods) and/or acoustic levels; network connected home appliances that measures energy use and/or appliance operating performance, times of appliance use, and/or maintenance events and schedules; network connected lighting controls that monitor energy use, lighting time, and/or lighting schedules; network connected surveillance systems and home environment sensors that monitor home access and/or security; network connected assisted living systems that track user activity; network connected locks that track window and door security; network connected door and window sensors that detect the opening and closing of doors (and in some applications, cabinets and drawers); and other connected or smart home devices or surrogates such as one or more mobile devices 106 and their built-in or interfaced sensors that are identified through position data, such as global positioning coordinates as being within a home. Data from the connected devices may be monitored and transferred through a secure network that may comprise a combination of connected devices, home-area networks, mobile networks, and fixed networks that provide connectivity and back-up between intelligent smart home devices and the network connected consumer control systems that interface the one or more home gateways. The connected devices or home gateways in communication with the connected devices may aggregate data through a structure free aggregation (to improve scalability) or structured aggregation that fuse the data with identifiers of the users and the connected device before the data is transmitted/retransmitted to another device or node. In a structured aggregation, like a tree based node aggregation, for example, where device identifier data is appended to the sensor data segment before the data string is relayed to a next connected operational device (which may comprise bucket-brigade connected devices that may dynamically route data through two or more nodes and thus around failing nodes) before being transmitted to the home gateway. The aggregation of data, whether it be at the connected devices via a structured aggregation, at the home gateways, or in combinations minimizes or eliminates redundant data transmissions, reduces bandwidth requirements, reduces data transmission errors, reduces power consumption, and provides fused information to the remote computing clouds 108 and/or connected data silos within the database server 110. Connected devices that may communicate to each other and other connected devices may employ low-power based technologies such as Bluetooth, ZigBee, IPv6, Cat-iq 4.0, and Z-Wave for example. In house connectivity may also be enabled through home area networks such as WiFi, Ethernet, HomePlug Av, and MoCa, for example. Further, the home gateways may append user identification data to the aggregated sensor data segments before the aggregated sensor data is transmitted to the remote computing clouds 108 and/or connected data silos via a tangible media or wireless media (e.g., via Ultrawideband, WiMax, mobile WiMax, cellular, satellite, etc.) and stored within the database server 110.

Figure 3:
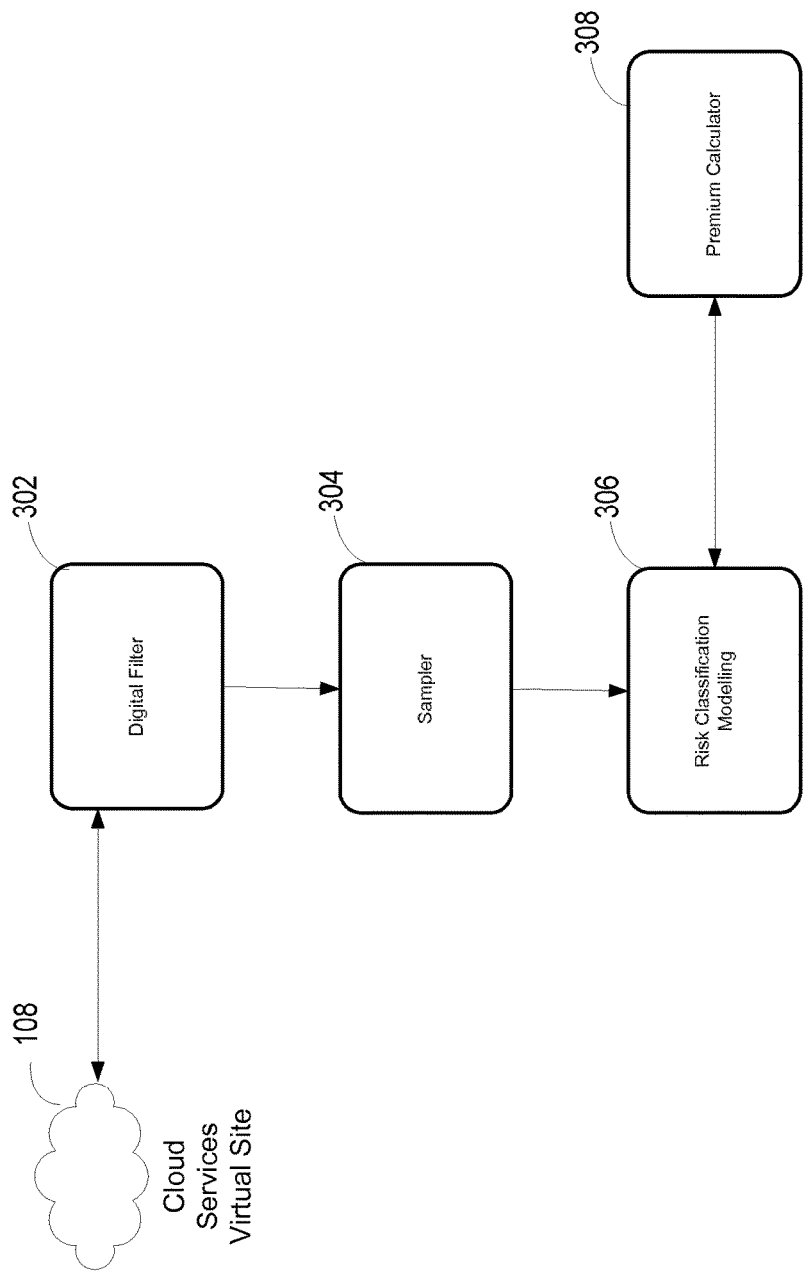
FIG. 3 is a block diagram of an exemplary predictive system interfaced to a cloud.

At the insurer side 102 or through a third party intermediary the predictive system's server clusters 116 mine, aggregate, and analyze the data accessed from the computing clouds 108 and/or data silos and/or IMDGs, some of which may be used as processing buffers as shown in FIGS. 1 and 3, or process the data as it is received by reading data directly from the home gateways or mobile devices. A digital filter 302 in communication with the server clusters 116 filters the usage data to identify missing data, incomplete data, and/or corrupt data or data words. Once aggregated and filtered, a sampler 304 automatically divides the data into sample-groups according to the data source and the rating variables used to underwrite the insured and/or rate the insurance product by the server clusters 116. The sampler 304 may store the divided data in and as sample-groups of data in an electronic accessible memory. The rating variables may comprise a smart meter rating variable, a home appliance rating variable, an assisted living rating variable, a surrogate rating variable, etc., for example. In this predictive system, the usage based rating variables are each segmented into classes (or rating groups, which is just one example of a risk model at 306) automatically based on actual usage based data associated with the respective rating variable and corresponding realized losses and/or predicted loss estimates associated with the usage based data. The automated segmentation may be based on the user's prior usage data and/or other homogeneous actual usage based data. In some systems the risk model 306 groups the data into classes based on site locations (e.g., postal code, street address, time zone, etc.), information on the physical characteristics of the dwelling (e.g., number of stories, construction type, occupancy, etc.), the financial terms of the insurance coverage or insurance policy (coverage limits, deductibles, etc.) and include or may be based exclusively on the estimated losses that may be associated with a specific event and an aggregation of events that reflects likely natural and human perils. A peril is a cause of a possible accident, loss, injury, or claim (such as a fire or wind). A premium calculator 308 or multiplier multiplies the multiplicative numerical rating factors identified by the home monitoring and control systems classes with a base insurance rate to determine the final homeowner premium charged to the customer. In other rating systems the final homeowner premium may include other multiplicative numerical rating factors associated with different rating variables, including rating factors associated with traditional insurance rating processes.

Besides property casualty insurance, the predictive system can streamline underwriting and rating processes and reduce underwriting and rating errors in all dimensions of insurance including specialty lines of insurance, health insurance, life insurance, etc. based on the analysis of usage based data that may be unrelated to the risk that is being insured against. The predictive systems may select or predict the insurance products to underwrite, to speed up the process for writing insurance policies and/or establish the correct premium rates by processing usage based data that is not necessarily related to the risk the insurance company is accepting. Unlike an insurance binder, the insurance policies described in this disclosure are not temporary or interim contracts that provide coverage until a formal or permanent insurance policy issues. The insurance policy described in this disclosure refers to the formal or permanent insurance policies that issue after an insurance company completes its insurance underwriting and insurance rating processes.

The systems, methods, and descriptions described may stand alone and they also may be encompassed within other systems and applications. Other alternate systems may include any combinations of structure and functions described above or shown in one or more or each of the figures. These systems or methods are formed from any combination of structure and function described in this disclosure. The structures and functions may process less, more, additional and different information or additional or different combinations of insurance rating variables. For example, an insurance premium may also be based on (or customized by) and generated from an operator profile or initial operator profile that comprises actual (e.g., usage based) data associated with, and in some systems provided by or generated directly from, the insured that distinguishes that insured from other insureds and is associated with an insured's insurance policy and in some embodiments may include deductibles and limits or prior deductibles or limits from an earlier insurance policy that are not required by law. The initial operator profiles may be generated prior to monitoring that occurs under an insurance policy (e.g., prior to monitoring driving characteristics under an insurance policy). Since insureds' behavior/driving behavior is unique, no two insureds will have the identical initial operator profiles. In a driving context, no two drivers will share an identical (initial) operator profile because no two drivers drive exactly the same way. Other alternate predictive systems may mine and process usage based data generated by some, all, or combinations of data generated by wearable technology such as wearable computers including those that are a unitary part of digital clothing (e.g., smart shirts, e-textiles), digital eyewear, smart watches, holographic optics, user wearable technology, and data generated by other monitoring devices (including alternative vehicle monitoring devices, e.g., On Board Diagnostic (OBD) devices that may physically or virtually interface OBD ports) that may be compatible with/communicate with the mobile device 106, mobile clients, vehicle information technology, vehicle telematics, and other electronic devices and transmitters. An alternate predictive system allows the sensors and wearable computers to communicate directly with the vehicle (vehicle telematics, example), or through home area networks such as WiFi, Ethernet, HomePlug Av, cellular, satellite, and MoCa for example, or directly with the computing cloud 108 and/or the remote computing clusters 116 without the mobile device 106. The usage based data may then be processed as through the predictive systems that may execute insurance underwriting and/or the described insurance rating processes herein.

The system and methods, and descriptions described may also be programmed in one or more controllers, devices, signal processors, and one, two, or more processors and a coprocessor (e.g., a coprocessor is a processor distinct from a main processor, that performs additional functions to assist the main processor). The processors may be arranged in a parallel processing structure and/or multiprocessing structure. Parallel processing may run on a computer containing two or more processors running simultaneously. Parallel processing differs from multiprocessing in the way a task may be distributed.

The controllers may comprise a processor or co-processors that support an insurance systems or process. The processor may comprise one, two, or more central processing units that execute the instruction code, mine usage based data, and access usage based data from a flat memory (e.g., memory that appears to a processor as one large addressable space) that generate, support, and complete an insurance underwriting and/or insurance rating operations in real time or near real time. The predictive systems may execute functions implemented by a processor that is customized by instruction code (and in some applications may be resident to mobile systems and mobile clients that may interface a unitary part of a vehicle, is a unitary part of a communication system, medical system, etc.). In some systems, a front-end processor may perform the complementary tasks of capturing usage based data for a processor or program to work with, and for making the usage based data files and processing results available to back-end insurance processors, controllers, or devices that execute the insurance underwriting and/or insurance rating process. In some other systems the entire process occurs on a customized mobile device 106.

The memory that may retain the predictive system programming may comprise a device that may store an ordered listing of executable instructions for implementing logical functions. The memory's reliability is achieved through redundancy and replication and may be accessed by a large set of application program interfaces (APIs) in the mobile devices 106 or servers on the insurer's side. A logical function may be implemented through digital circuitry, through source code, or through analog circuitry. A "computer-readable storage medium," "machine-readable medium," "propagated-signal" medium, and/or "signal-bearing medium" may comprise a non-transitory medium that stores, communicates, propagates, or transports software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium, as the software may be electronically stored as an image or in another format (e.g., through an optical scan), then compiled, and/or interpreted or otherwise processed. The processed medium may then be stored in a memory or database accessible by a database engine that provides access to a database management system. When such devices are responsive to such commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action "(i.e., the device's response) to . . . " merely follow another action.

Other systems, methods, features and advantages will be, or will become, apparent to one with skill in the art upon examination of the following figures and detailed description. This includes systems and processes that provide the same insurance underwriting, insurance rating, insurance premiums and/or discounts based the predictive systems or their outputs described in this disclosure. It is intended that all such additional systems, methods, features and advantages be included within this description, be within the scope of the invention, and be protected by the following claims.

We claim:

1. An automated system that improves the connectivity of home devices comprising:
    an interconnected smart home device that sends and receives data to another interconnected smart home device through a wireless network;
    the interconnected smart home device fuses a user identifier and a device identifier of the interconnected smart home device to the data after the interconnected smart home device measures a home's condition and before the interconnected smart home device communicates with another interconnected home device;
    the interconnected smart home device dynamically routes the data to an operational interconnected smart home device when another interconnected smart home device it attempts to communicate with fails; and
    a database engine that provides access to a plurality of database management systems that mine diverse sources of usage based data rendered by the interconnected smart home devices;
    a digital filter that selectively passes filtered data streams that comprises the usage based data by removing data records that have missing data fields, incomplete data, and corrupt data;
    a sampler that automatically divides the filtered data into sample groups associated with the user identifier and device identifier and stores the sample groups in a memory;
    the sampler divides the filtered data according to insurance rating variables associated with the user identifier and device identifier;
    the filtered data is processed by a processor programmed to underwrite an insurance product and rate the insurance product; and
    a multiplier that multiples a plurality of rating factors associated with the insurance rating variables and the sample groups with a base rate of insurance to determine a final insurance premium for the user.

2. The system of claim 1 where the digital filter is configured to interface a home gateway that aggregates the usage based data and is remote from the digital filter.

3. A multivariate system that automatically improves the interconnectivity of home devices comprising:
    a wireless communication interface configured to connect a smart home device to another smart home device to an insurance server cluster;
    the smart home device fuses a user identifier and a device identifier of the smart home device to data that the smart home device generates after the smart home device measures a home's condition and before the smart home device communicates with the another smart home device;
    the smart home device dynamically routes the data to an operational smart home device when another smart home device it attempts to communicate with fails;
    where the insurance server cluster comprising a group of independent network connected servers that operate and appear to a mobile client device as if the independent network servers were a single server computer is programmed to:
    receive usage based data through a mobile connection;
    derive a safety score based on the user identifier, the device identifier, and the usage based data for a homeowner insurance product; and
    derive a discount to an insurance premium for the homeowner insurance product based on the safety score.

4. The multivariate system of claim 3 the mobile client device executes code stored in the non-transitory media that renders insurance quoting services, insurance claims services, on-line insurance policy services, and usage based insurance services.

5. The multivariate system of claim 3 further comprising an automatic driver system programmed to identify the driver of a vehicle associated with the usage based vehicle data.

6. The multivariate system of claim 5 the automatic driver system identifies the driver of the vehicle through identification means.

7. The multivariate system of claim 5 the automatic driver system identifies facial and environmental characteristics of the driver at a mobile client through comparisons to a plurality of biometric templates at the mobile client.

8. The multivariate system of claim 3 the server cluster is further programmed to mine the usage based vehicle data from a computing cloud.

9. The multivariate system of claim 3 the server cluster is programmed to derive the discount to the insurance premium based on a numerical ranking of the safety score rated against a plurality of other safety scores.

10. The multivariate system of claim 3 where the insurance server cluster is configured to respond to native application clients resident to one or more of the mobile client devices and is programmed to execute code stored in a non-transitory media that renders insurance quoting services, insurance claims services, on-line insurance policy services, or usage based insurance services.

11. A multivariate system that improves the connectivity of home devices comprising:
    a wireless communication interface configured to connect smart home devices that send and receive usage based data streams through a wireless network;
    the interconnected smart home devices fuse a user identifier and a device identifier to the data after the interconnected smart home devices measure a home's condition and before the interconnected smart home devices communicate with another interconnected smart home device;
    the interconnected smart home devices dynamically route the usage based data streams to an operational interconnected smart home device when another interconnected smart home device it attempts to communicate with fails
    an insurance server cluster comprising a group of independent network servers that operate and appear to a mobile client device as if the independent network servers were a single server computer programmed to:
    receive usage based data associated with the user identifier and the device identifier through a mobile connection; and
    derive a rating variable based on the device identifier and the usage based data for a homeowner insurance product for the user.

12. The multivariate system of claim 11 an insured's final insurance premium is based on the rating variable.

13. The multivariate system of claim 11 an insured's final insurance premium comprises a multiplication of a plurality of rating factors associated with a plurality of rating variables and at least one rating variable is based on a driver safety score.

14. The multivariate system of claim 11 an insured's final insurance premium comprises a multiplication of an insurance rating factor associated with an insurance rating variable based on a probability of an insured filing an insurance claim during the insured's insurance coverage term of the insured's existing insurance policy.

15. The multivariate system of claim 11 where an insured's final insurance premium comprises a product of a plurality of rating factors associated with a plurality of rating variables and at least one rating variable is based on a driver safety score.

16. The multivariate system of claim 11 where an insured's final insurance premium comprises a product of a plurality of rating factors associated with a plurality of rating variables and at least one rating variable comprises a usage based vehicle characteristic.

17. The multivariate system of claim 11 where an insured's final insurance premium comprises a multiplication of a plurality of rating factors associated with a plurality of rating variables and at least one rating variable comprises a usage based home monitoring characteristic.

18. The multivariate system of claim 11 an insured's final insurance premium comprises a product of a plurality of rating factors associated with rating variables and at least one rating variable comprises a usage based home monitoring characteristic and a usage based vehicle monitoring characteristic.

19. The multivariate system of claim 11 further comprising a digital filter in communication with the insurance server cluster that filters the usage based data to identify missing data, incomplete data, and corrupt data.

20. The multivariate system of claim 11 where an insured's final insurance premium is generated by a multiplication of an insurance rating factor associated with an insurance rating variable based on a safety score.

21. The multivariate system of claim 11 the insurance server cluster is further programmed to derive an insured's final insurance premium for the homeowner insurance product based on the usage based data.

* * * * *